(12) United States Patent
Ye

(10) Patent No.: US 12,398,744 B2
(45) Date of Patent: Aug. 26, 2025

(54) TUBULAR END TO END COUPLING STRUCTURE

(71) Applicants: Beijing Sweatlife Technology Ltd., Beijing (CN); Sen Ye, Wuhan (CN)

(72) Inventor: Sen Ye, Wuhan (CN)

(73) Assignees: Beijing Sweatlife Technology Ltd., Beijing (CN); Sen Ye, Wuhan (CN)

( * ) Notice: Subject to any disclaimer, the term of this patent is extended or adjusted under 35 U.S.C. 154(b) by 340 days.

(21) Appl. No.: 18/132,448

(22) Filed: Apr. 10, 2023

(65) Prior Publication Data

US 2024/0141938 A1 May 2, 2024

(30) Foreign Application Priority Data

Nov. 2, 2022 (CN) .......................... 202222908119.1

(51) Int. Cl.
*F16B 7/18* (2006.01)

(52) U.S. Cl.
CPC .................................. *F16B 7/182* (2013.01)

(58) Field of Classification Search
CPC .. F16B 12/04; F16B 7/18; F16B 7/182; E06B 3/984; F16M 11/06; F16M 11/2014; F16M 11/045; F21V 21/28; F21V 21/26; F21V 21/30

See application file for complete search history.

(56) References Cited

U.S. PATENT DOCUMENTS

| | | | | |
|---|---|---|---|---|
| 1,853,578 | A * | 4/1932 | Ross ....................... | F16L 37/26 403/364 |
| 3,819,198 | A * | 6/1974 | Groves ..................... | A63C 5/02 403/339 |
| 4,025,215 | A * | 5/1977 | Murdock ................. | F16B 12/04 403/381 |
| 4,435,104 | A * | 3/1984 | Held ....................... | E06B 3/984 403/364 |
| 4,767,232 | A * | 8/1988 | Francis ................ | E04F 11/1834 403/113 |
| 5,275,444 | A * | 1/1994 | Wythoff .............. | F16L 27/0849 285/272 |
| 6,257,799 | B1 * | 7/2001 | Ribe ................... | E04F 11/1834 403/402 |
| 6,503,020 | B1 * | 1/2003 | Mascioletti ............. | F16B 12/46 403/231 |
| 11,971,157 | B2 * | 4/2024 | Lou .......................... | F16B 7/18 |

* cited by examiner

*Primary Examiner* — Daniel J Wiley

(57) ABSTRACT

A tubular end to end coupling structure includes a first inclined tube having a first inclined surface, a second inclined tube having a second inclined surface, and a coupling structure. The first inclined tube and the second inclined tube are connected by the coupling assembly. The coupling assembly includes a plurality of first convex teeth, tooth grooves, second convex teeth and second tooth grooves. The first convex teeth are engaged in the second tooth grooves, and the second convex teeth are engaged in the first tooth grooves. A first protrusion having a through hole is formed at the first inclined surface, a second protrusion having a through hole is formed at the second inclined surface, a first sidewall hole is formed in the first inclined tube, and a second sidewall hole is formed in the second inclined tube.

8 Claims, 6 Drawing Sheets

TUBULAR END TO END COUPLING STRUCTURE

FIELD OF THE INVENTION

The present utility relates to coupling structures, and more particularly to a tubular end to end coupling structure.

BACKGROUND OF THE INVENTION

Common couplers currently on the market are S&S coupler and Z-coupler, both of which are produced by traditional CNC turning and milling processes, with high cost, heavy weight, and no solution for special-shaped tubes. Therefore, a special structure is urgently needed to make a coupler suitable for any dimensional tubes that have a variety of shapes, with less weighs and cost, and which requires some special tools for installation and removal.

SUMMARY OF THE INVENTION

In view of the above situation, in order to overcome the defects of the prior art, the present invention provides a tubular end to end coupling structure, which effectively solves the problems mentioned in the above technical background.

A tubular end to end coupling structure includes a first inclined tube having a first inclined surface and a first inclined edge, a second inclined tube having a second inclined surface and a second inclined edge, and a coupling structure. The first inclined tube and the second inclined tube are connected by the coupling assembly. The coupling assembly comprises a plurality of first convex teeth formed at the first inclined edge, a plurality of tooth grooves each arranged between two adjacent of the first convex teeth, a plurality of second convex teeth formed at the second inclined edge, a plurality of second tooth grooves each arranged between two adjacent of the second convex teeth, a first protrusion formed at the first inclined surface, a second protrusion formed at the second inclined surface, a first sidewall hole formed at a peripheral wall of the first inclined tube, a second sidewall hole formed at a peripheral wall of the second inclined tube, the first convex teeth are aligned with the second tooth grooves, the second convex teeth are aligned with the first tooth grooves, and the through hole of the first protrusion aligns with second sidewall hole for receiving a screw entering from the second sidewall hole, and the through hole of the second protrusion aligns with the first sidewall hole for receiving a screw entering from the first sidewall hole.

The first sidewall hole and the second sidewall hole are obliquely formed in the peripheral wall of the first inclined tube and second inclined tube.

The through holes of the first protrusion and the second protrusion are threaded holes.

Gaps are reserved between the first convex teeth and the second tooth grooves, and between the second convex teeth and the first tooth grooves.

The first protrusion is perpendicular to the first inclined surface, and the second protrusion is perpendicular to the second inclined surface.

The first inclined surface and the second inclined surface each have at least one line hole formed therein, and the at least one line hole of the first inclined surface is aligned with the at least one line hole of the second inclined surface, and configured for passing through at least one bicycle brake line.

The first inclined surface and the second inclined surface are 45-degree inclined relative to a central axis along a longwise direction of the first inclined tube and a central axis along a longwise direction of the second inclined tube.

A limit hole is formed in each of the first inclined surface and the second inclined surface to communicate with the first sidewall hole and the second sidewall hole, respectively, and the first protrusion and the second protrusion align with the limit holes, and the screws extend through the limit holes to engage in the threaded holes.

The tubular end to end coupling structure is based on inclined misaligned occlusal teeth and can be further locked by screws entering from the sidewall holes to engage in the through holes of the protrusions on the inclined surfaces.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the utility model. In the attached drawings.

Figure 1:
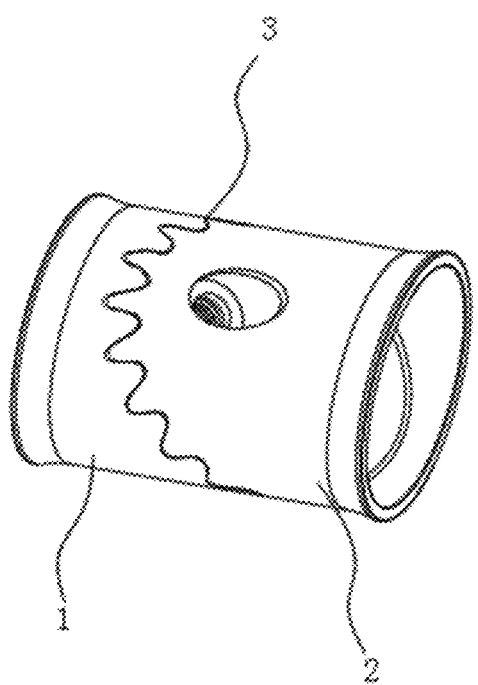
FIG. 1 is a schematic isometric structural view of a tubular end to end coupling structure according to an embodiment of the present invention.

Labels in the drawings: 1, first inclined tube; 2, second inclined tube; 3, coupling assembly; 301, first convex tooth; 302, first tooth groove; 303, second convex tooth; 304, second tooth groove; 305, the first protrusion; 306, the second protrusion; 307, through hole; 308, the sidewall hole; 309, limit block; 310, limit hole; 311, line hole; 10, first inclined surface; 20, second inclined surface; 312, bicycle brake line.

DETAILED DESCRIPTION OF PREFERRED EMBODIMENTS

Combined with FIGS. 1-6, the embodiments of the present invention are further described.

Embodiment one, as shown in FIGS. 1-6, a tubular end to end coupling structure is provided, which includes a first inclined tube 1, a second inclined tube 2 and a coupling assembly 3. The first inclined tube 1 and the second inclined tube 2 are connected through the coupling assembly 3. The first inclined tube 1 has an inclined surface 10 inclined 45 degrees relative to a central axis along a longwise direction of the first inclined tube 1, and the second inclined tube 2 has an inclined surface 20 inclined 45 degrees relative to a central axis along a longwise direction of the second inclined tube 2.

The coupling assembly 3 includes a plurality of first convex teeth 301, a plurality of first tooth grooves 302, a plurality of second convex teeth 303, a plurality of second tooth grooves 304, a first protrusion 305, a second protrusion 306, two through holes 307, two sidewall holes 308, two limit blocks 309 and two limit holes 310. The first inclined tube 1 has an inclined edge, and the plurality of first convex teeth 301 are formed at the inclined edge. The plurality of first tooth grooves 302 are formed with each one of the first tooth grooves 302 arranged between two adjacent first convex teeth 301. The second inclined tube 2 has an inclined edge, and the plurality of second convex teeth 303 are formed at the inclined edge. The plurality of second tooth grooves 304 are formed with each one of the second tooth grooves 304 arranged between two adjacent second convex teeth 303.

The first inclined surface 10 and the second inclined surface 20 are near the corresponding first inclined edge and the second inclined edge at one end of the first inclined tube 1 and second inclined tube 2, respectively. The other ends of the first inclined tube 1 and second inclined tube 2 are opened. The first protrusion 305 is formed on the inclined surface of the first inclined tube 1, and the second protrusion 306 is formed on the inclined surface of the second inclined tube 2. The through holes 307 are formed in the first protrusion 305 and the second protrusion 306, respectively. The sidewall holes 308 each are formed in a peripheral wall of the first inclined tube 1 and the second inclined tube 2, respectively. Ends of the sidewall holes 308 are opposite surfaces of the first inclined surface 10 and the second inclined surface 20, the limit holes 310 are formed through the first inclined surface 10 and the second inclined surface 10 and the corresponding opposite surfaces, diameters of the limit holes 310 are less than those of the sidewall holes 308, thereby forming the limit blocks 309, and the limit blocks 309 are configured for limiting a screw. The first inclined tube 1 and the second inclined tube 2 each further have at least one, for example two line holes 311 formed in the inclined surface 10 and the inclined surface 20, and the line holes 311 are configured for passing through bicycle brake lines 312 (see FIG. 6).

Specially, in assembly, the inclined surface of the first inclined tube 1 faces the inclined surface of the second inclined tube 2, the first convex teeth 301 of the first inclined tube 1 aligns with the second tooth grooves 304 of the second inclined tube 2, and the second convex teeth 303 of the second inclined tube 2 aligns with the first tooth grooves 302 of the first inclined tube 1, after this alignment, the first protrusion 305 of the first inclined tube 1 aligns with the sidewall hole 308 of the second inclined tube 2, the second protrusion 306 of the second inclined tube 2 aligns with the sidewall hole 308 of the first inclined tube 1, then screws (not shown), for example M6 hex screws can enter the sidewall hole 308 and extend into the limit holes 310 to be threaded in each of the through holes 307 of the first protrusion 305 and the second protrusion 306, to finish the coupling connection between the first inclined tube 1 and second inclined tube 2.

Beneficial effects: the tubular end to end coupling structure is novel in structure and ingenious in conception. It is based on 45-degree misaligned occlusal teeth and can be further locked with two screws which may enter from the sidewall holes to engage in the through holes of the protrusions on the inclined surfaces. In the present embodiment, certain gaps may be reserved between the first convex teeth 301 and the second tooth grooves 304, and as wall as between first tooth grooves 302 and the second convex teeth 303, that is the first convex teeth 301 and the second tooth grooves 304 are not tightly engaged, and the first tooth grooves 302 and the second convex teeth 303 are not tightly engaged to avoid the possibility of loosening due to wear and tear. No special tools are required, and conventional hexagonal tools can be used for installation and disassembly.

Embodiment Two

Figure 2:
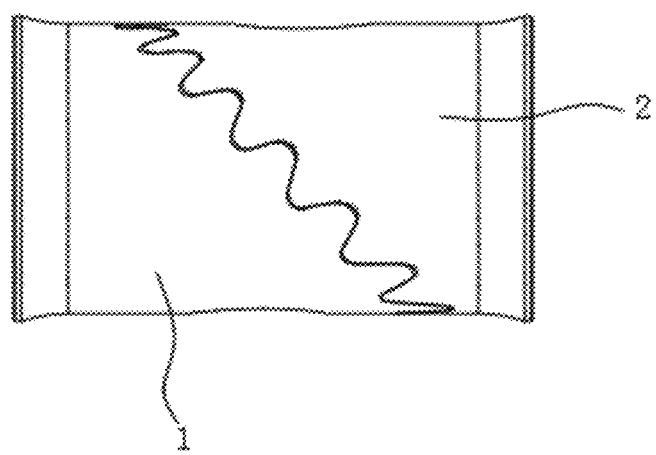
FIG. 2 is a schematic front view of the tubular end to end coupling structure according to the embodiment of the present invention.

In the embodiment one, as certain gaps are reserved between the first convex teeth 301 and the second tooth grooves 304, and as wall as between first tooth grooves 302 and the second convex teeth 303, the first inclined tube 1 and the second inclined tube 2 are inconvenient to engage, referring to FIG. 1 and FIG. 2, as another preferred embodiment, the difference from Embodiment one is that the first convex teeth 301 are engaged in the second tooth grooves 304, and the second convex teeth 303 are engaged in the first tooth grooves 302, so that the first inclined tube 1 is in the engagement with the second inclined tube 2.

Embodiment Three

Figure 3:
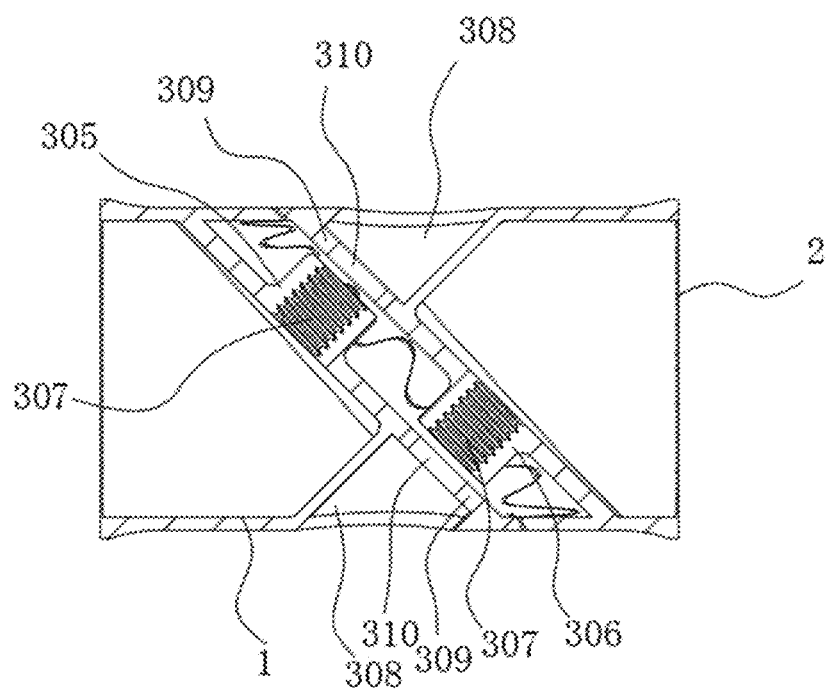
FIG. 3 is a schematic cross sectional view of the tubular end to end coupling structure according to the embodiment of the present invention.
Figure 4:
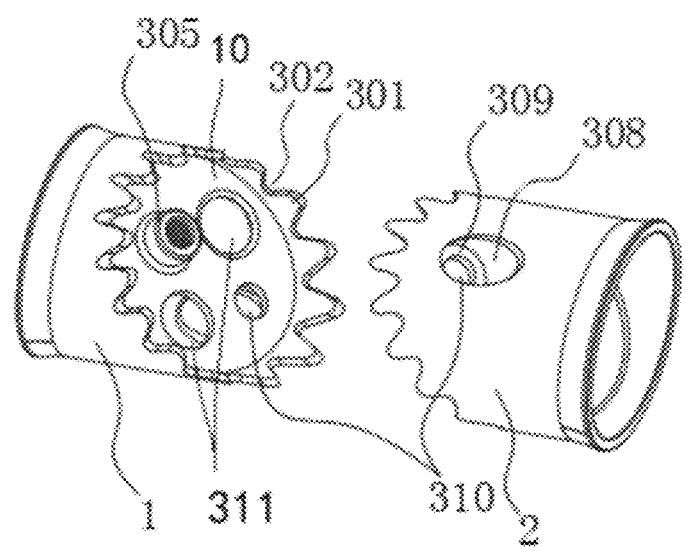
FIG. 4 is a schematic first exploded view of the tubular end to end coupling structure according to the embodiment of the present invention.
Figure 5:
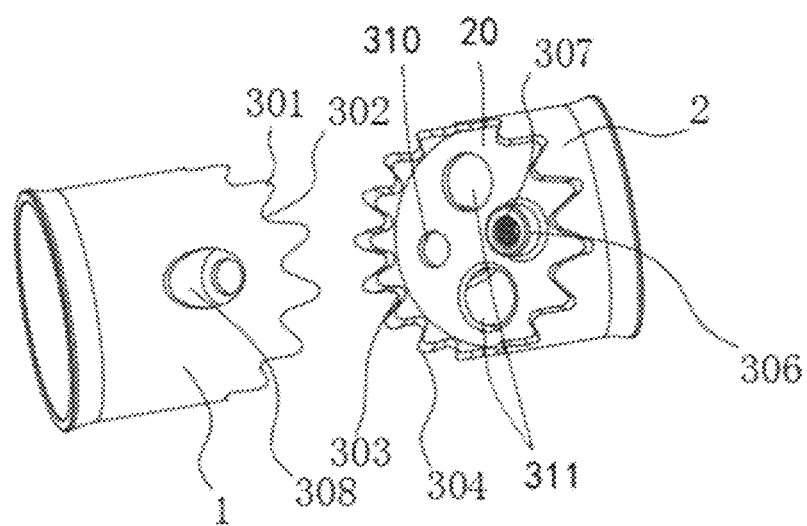
FIG. 5 is a schematic second exploded view of the tubular end to end coupling structure according to the embodiment of the present invention.
Figure 6:
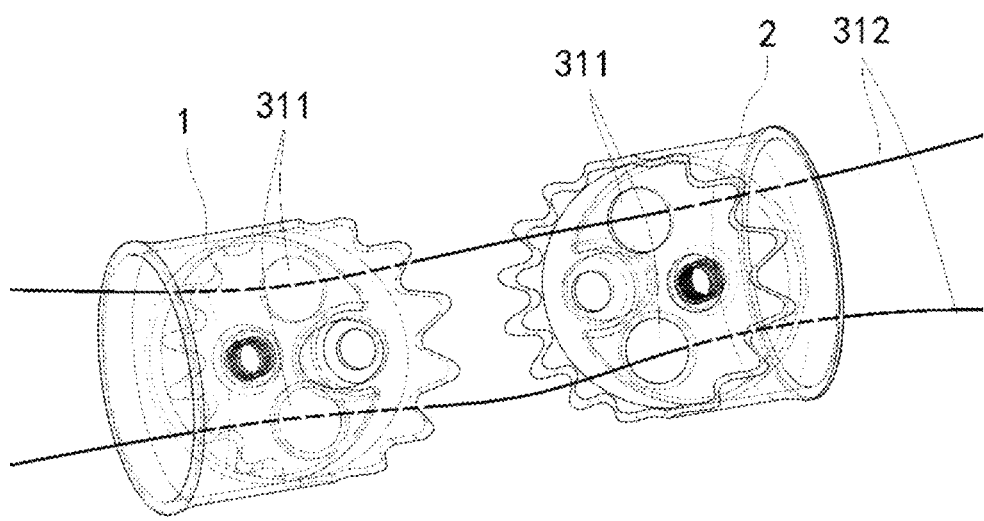
FIG. 6 is another schematic exploded view of the tubular end to end coupling structure showing bicycle brake lines extending through line holes according to the embodiment of the present invention.

In the embodiment one, the first protrusion 305 and the second protrusion 306 may be slantly formed, but they are inconvenient to use, referring to FIGS. 3-5, in another preferred embodiment, the difference from Embodiment one is that the first protrusion 305 is perpendicular to the inclined surface 10 of the first inclined tube 1, and the second protrusion 306 is perpendicular to the inclined surface 20 of the second inclined pipe 2, so that the first protrusion 305 and the second protrusion 306 are easily used.

Embodiment Four

Referring again to FIG. 3, in the preferred embodiment, the through holes 307 are threaded holes, thereby the screws can be better engaged in the threaded holes.

Embodiment Five

Referring again to FIG. 1, as another preferred embodiment, the difference from Embodiment one is that the sidewall holes 308 are obliquely formed in the peripheral wall of the first inclined tube 1 and second inclined tube 2, the sidewall hole 308 on the second inclined tube 2 corresponds to the first protrusion 305, and the sidewall hole 308 on the first inclined tube 1 corresponds to the second protrusion 306.

Finally, it should be noted that: the above are only preferred embodiments of the present invention, and are not intended to limit the invention, although the invention has been described in detail with reference to the foregoing embodiments, for those skilled in the art, it is still possible to modify the technical solutions described in the foregoing embodiments, or perform equivalent replacements for some of the technical features. any modification, equivalent replacement, improvement, etc. made within the spirit and principles of the present invention.

What is claimed is:

1. A tubular end to end coupling structure, comprising:
   a first inclined tube having a first inclined surface and a first inclined edge,
   a second inclined tube having a second inclined surface and a second inclined edge, and
   a coupling assembly, the first inclined tube and the second inclined tube being connected by the coupling assembly, wherein the coupling assembly comprises a plurality of first convex teeth formed at the first inclined edge, a plurality of first tooth grooves each arranged between two adjacent of the first convex teeth, a plurality of second convex teeth formed at the second inclined edge, a plurality of second tooth grooves each arranged between two adjacent of the second convex teeth, a first protrusion formed at the first inclined surface, and a second protrusion formed at the second inclined surface, a first sidewall hole formed at a peripheral wall of the first inclined tube, a second sidewall hole formed at a peripheral wall of the second inclined tube, the first convex teeth are aligned with the second tooth grooves, the second convex teeth are aligned with the first tooth grooves, the first protrusion and the second protrusion each have a through hole formed therein, and the through hole of the first protrusion aligns with second sidewall hole for receiving a screw entering from the second sidewall hole, and the through hole of the second protrusion aligns with the first sidewall hole for receiving a screw entering from the first sidewall hole.

2. The coupling structure according to claim 1, wherein the first sidewall hole and the second sidewall hole are obliquely formed in the peripheral wall of the first inclined tube and second inclined tube.

3. The coupling structure according to claim 1, wherein the through holes of the first protrusion and the second protrusion are threaded holes.

4. The coupling structure according to claim 3, wherein a limit hole is formed in each of the first inclined surface and the second inclined surface to communicate with the first sidewall hole and the second sidewall hole, respectively, and the first protrusion and the second protrusion align with the limit holes, and the screws extend through the limit holes to engage in the threaded holes.

5. The coupling structure according to claim 1, wherein gaps are reserved between the first convex teeth and the second tooth grooves, and between the second convex teeth and the first tooth grooves.

6. The coupling structure according to claim 1, wherein the first protrusion is perpendicular to the first inclined surface, and the second protrusion is perpendicular to the second inclined surface.

7. The coupling structure according to claim 1, wherein the first inclined surface and the second inclined surface each have at least one line hole formed therein, and the at least one line hole of the first inclined surface is aligned with the at least one line hole of the second inclined surface, and configured for passing through at least one bicycle brake line.

8. The coupling structure according to claim 1, wherein the first inclined surface and the second inclined surface are near the corresponding first inclined edge and the second inclined edge, and are 45-degree inclined relative to a central axis along a longwise direction of the first inclined tube and a central axis along a longwise direction of the second inclined tube.

* * * * *